United States Patent
Puga et al.

(10) Patent No.: US 11,431,188 B1
(45) Date of Patent: Aug. 30, 2022

(54) SYSTEM FOR HIGHLY EFFICIENT TRANSFER OF ENERGY PRODUCED BY PHOTOVOLTAIC PANELS INTO BATTERIES FOR STORAGE

(71) Applicant: HiVE Energy Systems, LLC, Kahului, HI (US)

(72) Inventors: Richard Puga, Kahului, HI (US); David Kim, Kahului, HI (US); Daniel O'Connell, Kahului, HI (US); James Loux, Kahului, HI (US)

(73) Assignee: HIVE ENERGY SYSTEMS LLC, Kahului, HI (US)

( * ) Notice: Subject to any disclaimer, the term of this patent is extended or adjusted under 35 U.S.C. 154(b) by 0 days.

(21) Appl. No.: 15/857,833

(22) Filed: Dec. 29, 2017

Related U.S. Application Data

(60) Provisional application No. 62/440,071, filed on Dec. 29, 2016.

(51) Int. Cl.
| | | |
|---|---|---|
| *H02J 7/00* | (2006.01) | |
| *H02J 7/35* | (2006.01) | |
| *H02S 10/20* | (2014.01) | |
| *H02S 40/38* | (2014.01) | |
| *H02J 7/34* | (2006.01) | |

(52) U.S. Cl.
CPC ............... *H02J 7/35* (2013.01); *H02J 7/008* (2013.01); *H02J 7/342* (2020.01); *H02S 10/20* (2014.12); *H02S 40/38* (2014.12)

(58) Field of Classification Search
CPC .. H02J 7/35; H02J 7/355; H02J 7/0054; H02J 7/008; Y02E 60/12; H01M 10/465; H01M 16/006; H02S 10/20; H02S 40/38
USPC .............................................. 320/101
See application file for complete search history.

(56) References Cited

U.S. PATENT DOCUMENTS

| | | | | |
|---|---|---|---|---|
| 2007/0268001 | A1* | 11/2007 | Doll | H02J 7/0024 |
| | | | | 320/128 |
| 2008/0143292 | A1* | 6/2008 | Ward | B60L 58/15 |
| | | | | 320/101 |
| 2012/0004875 | A1* | 1/2012 | Maeda | H01M 10/48 |
| | | | | 702/63 |
| 2012/0249047 | A1* | 10/2012 | Kelly | H01M 10/465 |
| | | | | 320/101 |
| 2013/0181533 | A1* | 7/2013 | Capp | H02J 1/00 |
| | | | | 307/82 |
| 2015/0229131 | A1* | 8/2015 | Gerhardinger | H02J 3/381 |
| | | | | 307/22 |

(Continued)

FOREIGN PATENT DOCUMENTS

| | | | | |
|---|---|---|---|---|
| EP | 2276100 A3 * | 8/2012 | | B60L 8/003 |

*Primary Examiner* — Richard Isla
*Assistant Examiner* — Mohammed J Sharief
(74) *Attorney, Agent, or Firm* — Cermak Nakajima & McGowan LLP; James Creighton Wray

(57) ABSTRACT

A power conditioner with iterative switching for charging a battery pack from a photovoltaic panel senses sunlight on panel cells, senses battery cells charges, senses panel output voltage and battery pack voltage, connects the panels to battery packs upon sensing sunlight and panel output voltage greater than battery pack voltage, disconnects the panels when battery cells approach full charge, reconnects the panels to the battery pack when battery charges drop and iteratively switches the connections on and off according to the readings from voltage sensors.

6 Claims, 5 Drawing Sheets

(56) References Cited

U.S. PATENT DOCUMENTS

| | | | | |
|---|---|---|---|---|
| 2016/0342140 A1* | 11/2016 | Baba | .................. | G04R 20/04 |
| 2017/0194811 A1* | 7/2017 | Chan | .................. | H02J 7/04 |
| 2017/0227607 A1* | 8/2017 | Wu | .................. | H01M 6/5083 |
| 2019/0044403 A1* | 2/2019 | Kano | .................. | H02K 3/38 |

\* cited by examiner

SYSTEM FOR HIGHLY EFFICIENT TRANSFER OF ENERGY PRODUCED BY PHOTOVOLTAIC PANELS INTO BATTERIES FOR STORAGE

This application claims the benefit of U.S. Provisional Application No. 62/440,071 filed Dec. 29, 2016, which is hereby incorporated by reference in its entirety as if fully set forth herein.

BACKGROUND OF THE INVENTION

Photovoltaic (PV) panels are used to convert energy from solar radiation into electrical energy. PV panels are constructed from a set of solar cells, each cell producing a DC current through the photovoltaic effect when exposed to sunlight. The photovoltaic effect causes these cells to become sources of electrical current. Each cell produces a small, fairly constant voltage once there is sufficient sunlight incident upon it. However, the amount of current that each cell produces is dependent on the level of sunlight that actually illuminates the cell. These solar cells can be connected in series in the PV panel, and multiple PV panels can be connected in series in order to increase the voltage output of the panel. The higher voltage allows the power produced by the group of panels to be delivered with lower current and with resulting lower electrical interconnection losses. Power Conditioners are used to implement the combination of PV panels into larger groups.

There are various techniques used by different Power Conditioners to combine and control the voltage and currents produced by groups of PV panels. These techniques are typically optimized such that they always try to produce the maximum electrical power available from the group of PV panels. One technique that is predominately utilized is called Maximum Power Point Tracking (MPPT). MPPT constantly modifies the impedance of the Power Conditioner to always draw the maximum instantaneous power flow from the PV panels by varying the voltage. However, a Power Conditioner utilizing MPPT must regularly interrupt the power flow for very short time intervals in order to determine the maximizing setting of voltage and current flow. Also, a minimum level of power production from the PV panels is required before the MPPT process can start to function. These limitations reduce energy production of the PV panels, especially during low sunshine level conditions.

Needs exist for better control of transfer of energy from PV panels.

SUMMARY OF THE INVENTION

For the specific application of transferring energy produced by PV panels into storage battery systems, optimizing the level of power production of the PV panels is not necessarily the most efficient technique possible. The energy transferred from the PV panels is determined by the power level during the time that the energy is transferred, so any time that the energy transfer is not occurring causes the total energy transferred to be reduced, lowering the energy transfer efficiency between the PV panels and the storage battery system. In addition, storage batteries will accept energy at a constant rate as long as they are not fully charged and the voltage of the charging Power Conditioner is higher than the battery voltage. Since the battery voltage remains essentially constant in its charging state, there is no improvement in energy transfer from the Power Conditioner by varying its voltage output once it is above the battery voltage. The invention is a technique to maximize the total energy transfer from PV panels into storage batteries, and therefore to make this energy transfer highly efficient.

TECHNICAL DESCRIPTION, DETAILS AND SUPPORTING DATA

The new method connects storage batteries directly to the output of PV panels through a Power Conditioner in a manner that ensures that when the PV panels are producing energy, they will produce an electrical voltage higher than the total voltage of the storage battery system. Therefore, whenever the PV panels are exposed to sunlight, they will be capable of transferring energy into the storage batteries, even when the power level transferred is small. The Power Conditioner is designed to simply combine the output of the PV panels such that the total voltage is the sum of the voltages of all of the panels connected into the Power Conditioner, even if those cells are not connected in series electrically. The Power Conditioner chosen therefor combines these voltages to ensure that the voltage connected to the storage battery system is higher than the sum total voltage of all of the battery cells in the storage battery system and protects from any current flowing backwards out of the batteries toward the PV panels.

Optimizing the voltage and current levels for maximum power production is not equivalent to optimizing them for total energy transfer. In fact, a Power Conditioner that performs Maximum Power Point Tracking (MPPT) typically modifies its impedance to increase the voltage of the PV panel output during times other than solar noon, using its lowest internal impedance at solar noon when the highest current is produced from the solar cells. This creates an increased energy loss in the Power Conditioner during the higher internal impedance times compared to operating with a lower internal impedance at all times. This MPPT approach intentionally increases the voltage at times other than peak current production times in order to maximize the power produced by using this higher voltage during the lower current production times of the PV panels.

Most battery systems have a fairly flat voltage level throughout their charge cycle, with the greatest variation in their voltage output being at the fully charged and the fully discharged ends of the cycle. As the battery approaches a fully discharged state, the voltage drops at an increasing rate until it finally quickly drops toward zero. Allowing a battery to approach or especially reach a zero voltage state will typically destroy the chemistry of the battery, making it unusable. Similarly, as most batteries approach a fully charged state, the output voltage will rise at an increasing rate. Overcharging a battery can also destroy its chemistry, and must also be avoided. However, for all of the states between approaching charged and approaching discharged, battery systems are constant voltage systems. No matter how much current flows into or out of most batteries in their normal operational/charging state, their output voltage remains fairly constant.

When connected to the batteries through a low internal impedance Power Conditioner, the voltage output of the PV panels is limited to the battery voltage, since the battery will draw any and all current from the PV panel output through the Power Conditioner into the battery. As long as the charging source voltage is above the battery voltage and since the internal impedance of the battery system is very low, current will flow at a level limited only by the impedance of the charging source. Any internal impedance intentionally added into the system, such as for MPPT by the Power Conditioner, will limit the current flow and add to internal energy losses in the Power Conditioner. However, the invention uses a Power Conditioner with constant and minimal internal impedance at all times, so virtually all losses are in the PV panels due to their own impedance varying as the amount of sunlight incident on different solar cells changes in level. Therefore, the maximum amount of energy that is available from the PV panels is transferred into the storage batteries, resulting in a high efficiency of energy transfer.

As the battery pack is charged, both the voltages of the individual battery cells increase and the capacity for the battery cells to accept more energy reduces. In order to fully charge the batteries in a safe manner, the invention includes limiting the energy transferred as the battery cells become fully charged. This is an iterative switching process that monitors the battery cell voltages and switches the charging off and on as the entire battery pack approaches its fully charged state. Similarly, battery cell voltages are monitored to protect the battery system as the battery cells approach their discharged state by stopping the discharging current.

The invention includes a photovoltaic panel, a power storage battery system and an energy transfer controller configured for connecting and disconnecting between the photovoltaic panel and the power storage battery system. The energy transfer controller has high voltage switches and the power storage battery system has power storage batteries configured for operating in a range between a first percentage above and a second percentage below a rated voltage. The high voltage switches are the iterative high voltage switches configured for electrically connecting the photovoltaic panel to the power storage batteries when the photovoltaic panel produces voltages higher than the voltage of the power storage batteries and for electrically disconnecting the photovoltaic panels from the power storage batteries when the voltage output from the photovoltaic panels exceeds the operating range of the power storage batteries.

In one embodiment, the first percentage is about 20% above and the second percentage is about 20% below a rated voltage. The iterative high voltage switches are configured to initiate charging of the battery system as soon as sunshine is incident on the photovoltaic panel. The iterative high voltage switches are also configured for disconnecting the photovoltaic cells from the battery system when the voltage from the photovoltaic panel exceeds the rated voltage of the power storage batteries by a certain percentage. In one embodiment, that certain percentage is about 3%. The iterative high voltage switches are configured to reconnect the photovoltaic panel to the battery system when a voltage from the photovoltaic cells drops to a predetermined percentage above the rated voltage of the battery system.

In one embodiment of the invention, the predetermined percentage is about 2%. Thereafter the iterative high voltage switches are configured to open when the voltage from the photovoltaic panel exceeds about 5% of the rated voltage of the battery system.

The iterative high voltage switches are configured to reconnect the photovoltaic panel to the battery system when the voltage from the photovoltaic panel drops to about 2% above the rated voltage of the battery system. Thereafter the iterative high voltage switches are configured to open when the voltage from the photovoltaic panel exceeds about 7% of the rated voltage of the battery system.

Then the iterative high voltage switches are configured to reconnect the photovoltaic panel to the battery system when a voltage from the photovoltaic panel drops to about 2% above the rated voltage of the battery system.

The new method of control includes providing photovoltaic cells, serially connecting the photovoltaic cells, providing a power storage battery system having a voltage operating range, providing an energy transfer controller configured for connecting to the serially connected photovoltaic cells and the power storage battery system, connecting the energy transfer controller to the battery system and to the photovoltaic cells when the output of the serially connected photovoltaic cells is within a predetermined range within the operating range of the battery system and disconnecting the energy transfer controller from the power storage battery system when the output of the serially connected photovoltaic cells is outside the predetermined range.

One operating range of the battery system is about 450 volts+40 volts and −30 volts. One predetermined range is about 450 volts+30 volts and −20 volts.

A new system includes providing a photovoltaic array of photovoltaic cells, connecting the photovoltaic cells in series, providing iterative switches, providing a battery system having battery cells, switching on the iterative switches and connecting the photovoltaic cells to the battery system when sunlight is on the photovoltaic cells. The new system transfers energy from the photovoltaic cells to the battery system while monitoring battery cell voltage. The new system limits the energy transferred to the battery system by switching off the iterative switches and disconnecting the photovoltaic cells from the battery system as the battery cell voltage approaches a fully charged state and switching on and connecting the photovoltaic cells to the battery system with the iterative switches as the battery approaches a lower charged state.

Sequentially switching on and switching off the iterative switches thereby connects and disconnects the photovoltaic array to and from the battery system and maintains monitored battery cells in the battery system within a predetermined range of charge as the battery system is charged and discharged.

One predetermined range for opening the iterative switches and disconnecting the photovoltaic array from the battery system is about +10% to about 3% over a rated voltage of the battery system. The predetermined range is adjusted by a rate of change of battery charge and discharge.

These and further and other objects and features of the invention are apparent in the disclosure, which includes the above and ongoing written specification, with the claims and the drawings.

The new power conditioner with iterative switching for charging a battery pack from a photovoltaic panel senses sunlight on panel cells, senses battery cells charges, senses panel output voltage and battery pack voltage. The new power conditioner connects the panels to battery packs upon sensing sunlight and panel output voltage greater than battery pack voltage. The new power conditioner disconnects the panels when battery cells approach full charge, reconnects the panels to the battery pack when battery charges drop and iteratively switches the connections on and off according to the readings from the voltage sensors.

DETAILED DESCRIPTION

Figure 1:
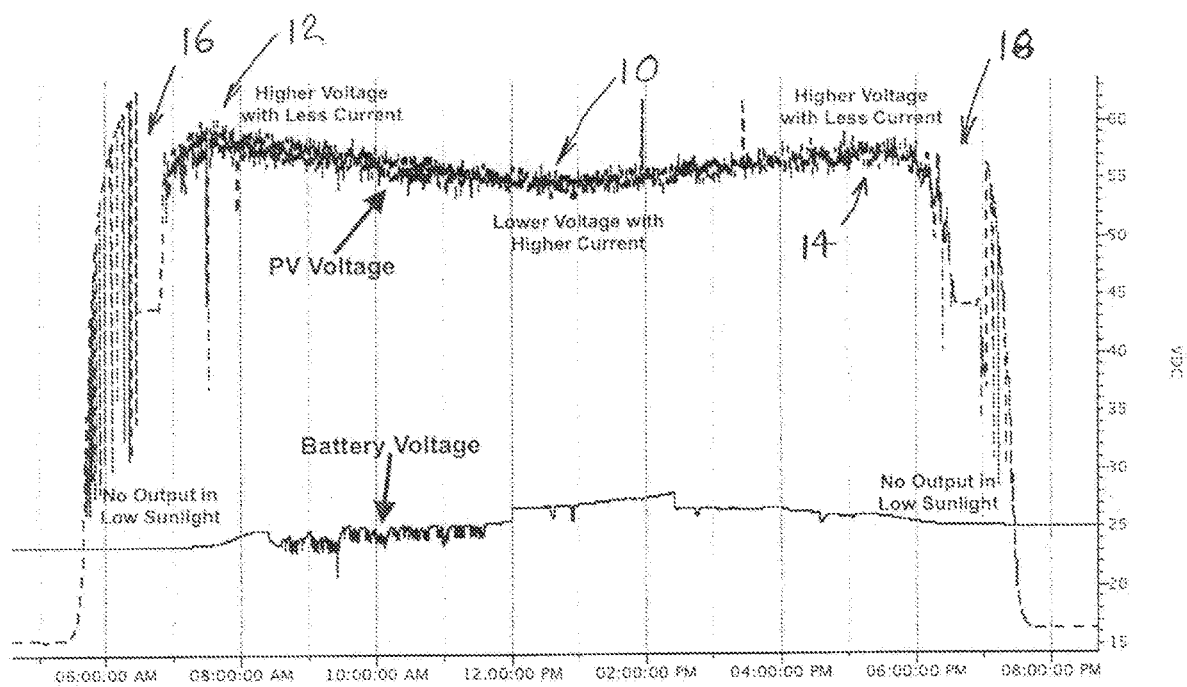
FIG. 1 shows MPPT Performance showing Voltage Increase and Loss of Power Production with Low Sunshine.
Figure 2:
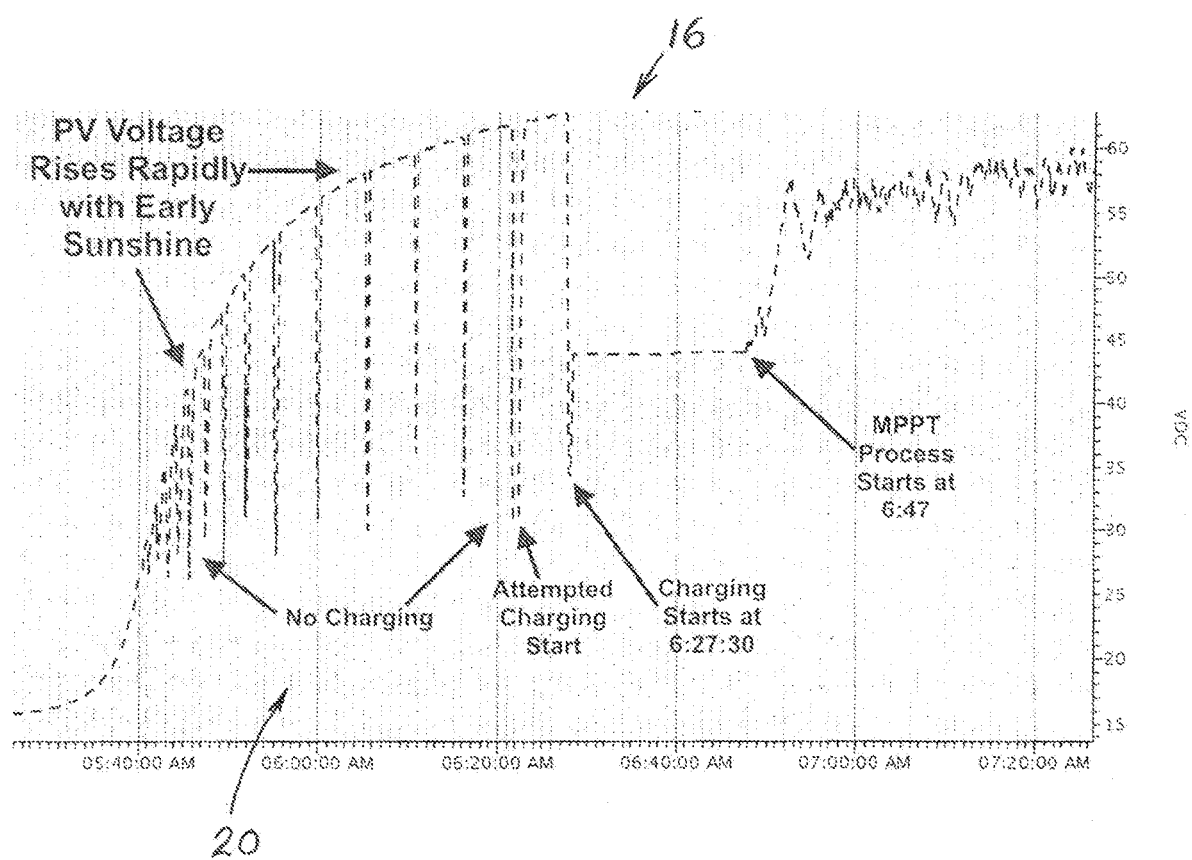
FIG. 2 shows MPPT morning low sunshine performance—PV voltage.
Figure 3:
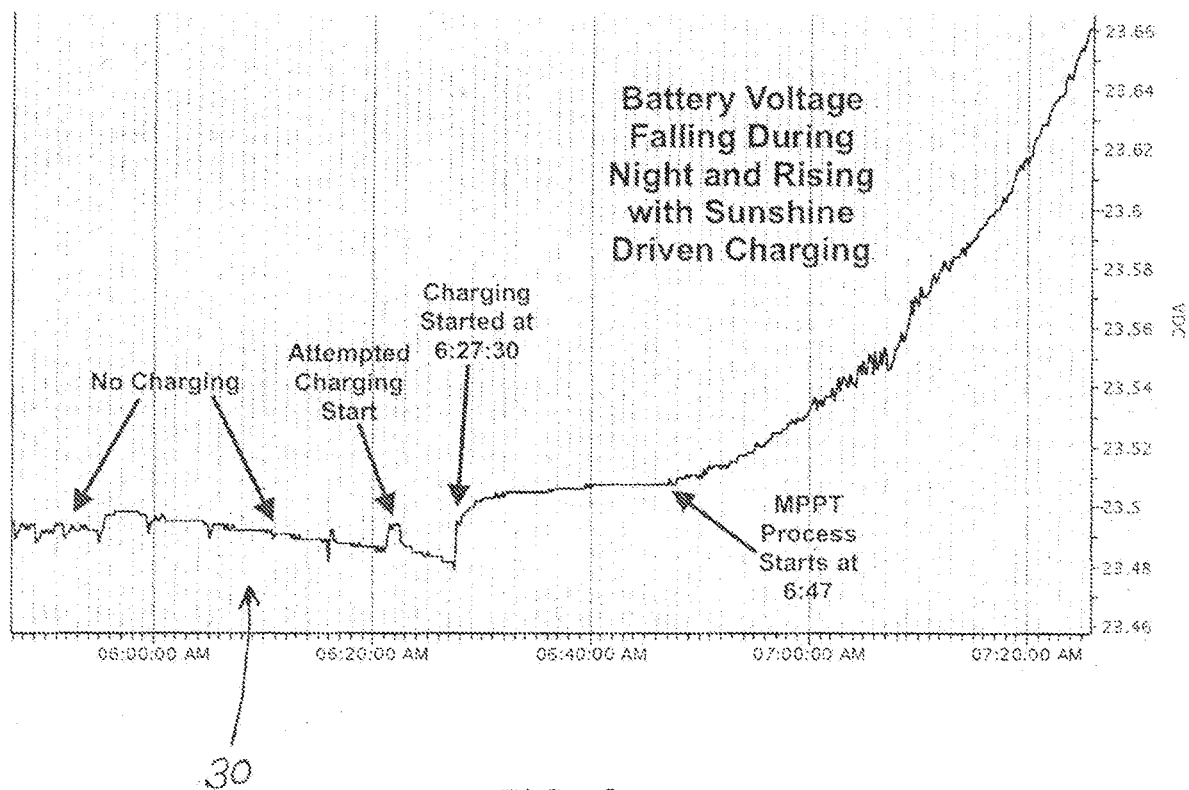
FIG. 3 shows MPPT morning low sunshine performance—battery voltage.
Figure 4:
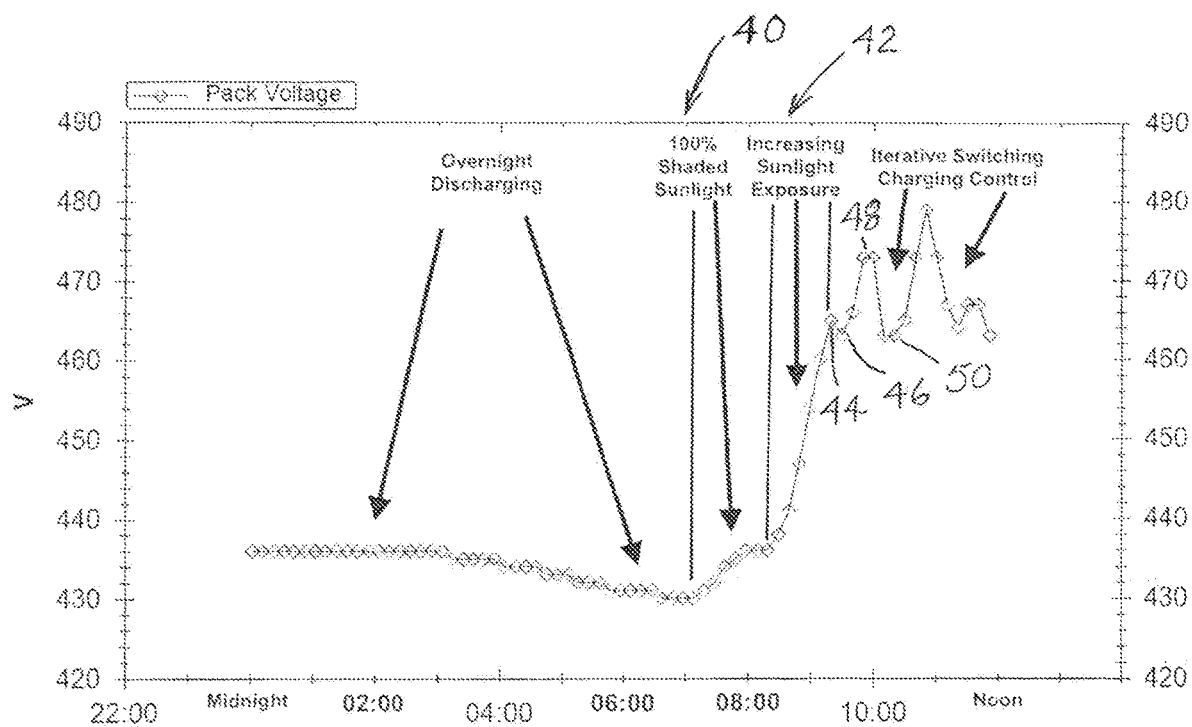
FIG. 4 shows the invention morning performance showing active charging in diffuse and low sunshine conditions—storage battery system voltage.

FIGS. 1-3 demonstrate the operation of a Power Conditioner that uses MPPT. FIG. 4 shows the operation of the invention using a Power Conditioner without MPPT.

FIG. 1 shows how the MPPT Power Conditioner adjusts the PV output voltage to the lowest value 10 when the PV is producing the highest current, typically raising the PV voltage in the morning 12 and afternoon 14 hours. The chart also shows how PV energy production is shut down in the early morning 16 and late afternoon 18 hours.

FIGS. 2 and 3 show the details of how power is lost 20, 30 during the early morning and late afternoon hours when a typical Power Conditioner uses MPPT. No charging occurs for almost an hour after sunshine is incident on the panels. This installation uses a 24 volt battery system.

FIG. 4 shows how the invention, using a Power Conditioner without any MPPT, initiates charging of the battery system as soon as any sunshine 40 is incident on the PV panels, even if it is not direct sunshine. The PV panels used to charge this test installation are shaded in the early morning and not exposed to any direct sunshine until after 8:30 am. Their exposure to direct sunshine is also blocked by some trees in the morning, so the level of sunshine incident on the PV panels is strongly dependent on the changing position of the sun in the sky as the morning progresses. The battery system used in the test implementation is a 450 volt system.

Increasing sunlight exposure 42 raises the battery pack to about 465 volts, and the iterative switching stops 44 and restarts 46 the charging. The iterative switching again stops 48 and restarts 50 the charging when battery cells approach full charge. The iterative switching also disconnects the battery from the photovoltaic array when the sun no longer casts light upon the photovoltaic cells.

Figure 5:
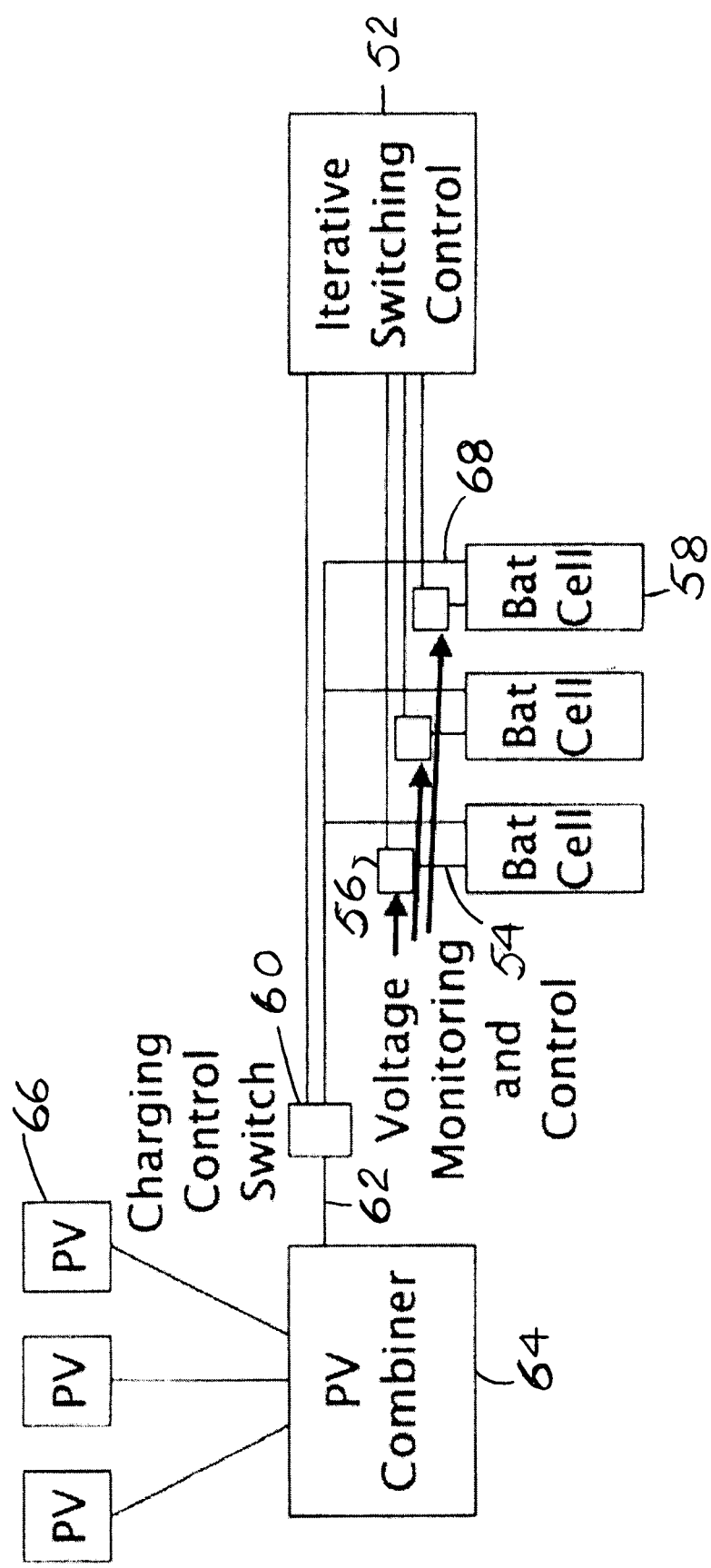
FIG. 5 schematically shows the iterative switching control.

FIG. 5 schematically shows the iterative switching control 52 that senses 54 and monitors 56 battery cell 58 voltages and switches 60 the output 62 of the photovoltaic combiner 64 from array 66 to inputs 68 of the battery cells 58 when the battery cells are less than fully charged.

While the invention has been described with reference to specific embodiments, modifications and variations of the invention may be constructed without departing from the scope of the invention, which is defined in the following claims.

We claim:

1. A method comprising:
providing photovoltaic cells,
serially connecting the photovoltaic cells,
providing a power storage battery system having a voltage operating range,
providing an energy transfer controller configured for connecting to the serially connected photovoltaic cells and the power storage battery system,
iteratively connecting and disconnecting high voltage switches in the energy transfer controller between the photovoltaic cells and the power storage battery system,
connecting the energy transfer controller to the power storage battery system and to the photovoltaic cells when an output of the serially connected photovoltaic cells is within a predetermined range of the power storage battery system within an operating range of the power storage battery system, and
disconnecting the energy transfer controller from the power storage battery system when the output of the serially connected photovoltaic cells is outside the predetermined range, wherein the high voltage switches are iterative high voltage switches configured for electrically connecting the photovoltaic cells to the power storage battery system when the photovoltaic cells produce voltages higher than voltage of the power storage battery system and for electrically disconnecting the photovoltaic cells from the power storage battery system when the voltage output from the photovoltaic cells exceeds a first percentage above a rated voltage of the power storage battery system.

2. The method of claim 1, wherein the operating range of the power storage battery system is 450 volts+40 volts and −30 volts.

3. The method of claim 1, wherein the predetermined range is 450 volts+30 volts and −20 volts.

4. A method comprising:
providing a photovoltaic array of photovoltaic cells,
connecting the photovoltaic cells in series,
providing iterative switches,
providing a battery system having battery cells,
switching on the iterative switches and connecting the photovoltaic cells to the battery system when sunlight is on the photovoltaic cells,
transferring energy from the photovoltaic cells to the battery system,
monitoring battery cell voltage,
limiting the energy transferred to the battery system by switching off the iterative switches and disconnecting the photovoltaic cells from the battery system as the battery cell voltage approaches a fully charged state,
switching on and connecting the photovoltaic cells to the battery system with the iterative switches as the battery system approaches a lower charged state, and
sequentially switching on and switching off the iterative switches, thereby connecting and disconnecting the photovoltaic array of the photovoltaic cells to and from the battery system and maintaining monitored battery cells in the battery system within a predetermined range of charge as the battery system is charged and discharged, wherein the high voltage switches are iterative high voltage switches configured for electrically connecting the photovoltaic cells to the battery system when the photovoltaic cells produce voltages higher than voltage of the battery system and for electrically disconnecting the photovoltaic cells from the battery system when a voltage output from the photovoltaic cells exceeds a first percentage above a rated voltage of the battery system.

5. The method of claim 4, wherein the predetermined range for opening the iterative switches and disconnecting the photovoltaic array of the photovoltaic cells from the battery system is +10% to 3% over the rated voltage of the battery system.

6. The method of claim 5, where the predetermined range is adjusted by a rate of change of the battery system discharge.

* * * * *